United States Patent
Takanashi et al.

(10) Patent No.: US 6,825,991 B2
(45) Date of Patent: Nov. 30, 2004

(54) LENS DRIVING DEVICE

(75) Inventors: Tatsuo Takanashi, Hachioji (JP); Junichi Ito, Fuchu (JP)

(73) Assignee: Olympus Optical Co., Ltd., Tokyo (JP)

( * ) Notice: Subject to any disclaimer, the term of this patent is extended or adjusted under 35 U.S.C. 154(b) by 1 day.

(21) Appl. No.: 09/989,516

(22) Filed: Nov. 20, 2001

(65) Prior Publication Data

US 2002/0093745 A1 Jul. 18, 2002

(30) Foreign Application Priority Data

Nov. 28, 2000 (JP) .............................. 2000-361714

(51) Int. Cl.[7] ............................................. G02B 15/14
(52) U.S. Cl. .......................... 359/696; 359/699; 359/823
(58) Field of Search ........................ 359/696, 699–701, 359/823, 697

(56) References Cited

U.S. PATENT DOCUMENTS

| | | | | |
|---|---|---|---|---|
| 4,149,775 A | * | 4/1979 | Blake | 359/696 |
| 4,525,037 A | * | 6/1985 | Metabi | 359/740 |
| 5,138,355 A | * | 8/1992 | Morisawa | 396/132 |
| 5,576,892 A | * | 11/1996 | Hotta et al. | 359/696 |
| 5,973,857 A | * | 10/1999 | Kaneda | 359/701 |
| 6,134,053 A | | 10/2000 | Kabe et al. | 359/694 |
| 6,349,173 B1 | * | 2/2002 | Kanai et al. | 396/90 |

FOREIGN PATENT DOCUMENTS

JP    11-287941 A    10/1999    ............ G02B/7/02

* cited by examiner

*Primary Examiner*—Jordan M. Schwartz
*Assistant Examiner*—Jessica Stultz
(74) *Attorney, Agent, or Firm*—Frishauf, Holtz, Goodman & Chick, P.C.

(57) ABSTRACT

A lens barrel incorporating a lens driving device is provided which includes a fixed frame, a cam ring inserted into the fixed frame in freely rotatable fashion, first and free forward and backward motion, and an aperture ring supported by the first group lens frame in a freely rotatable manner. In the cam ring, there are provided a diagonal cam groove which drives the first and second group lens frames to zoom positions in stages, circumferential-direction cam grooves which hold each zoom position, and aperture cam grooves which drive the aperture ring. In a state in which the first and second group lens frames are positioned and fixed at respective zoom positions, the cam ring can be rotated to rotate the aperture ring, thereby setting the aperture value of the pickup lenses.

15 Claims, 12 Drawing Sheets

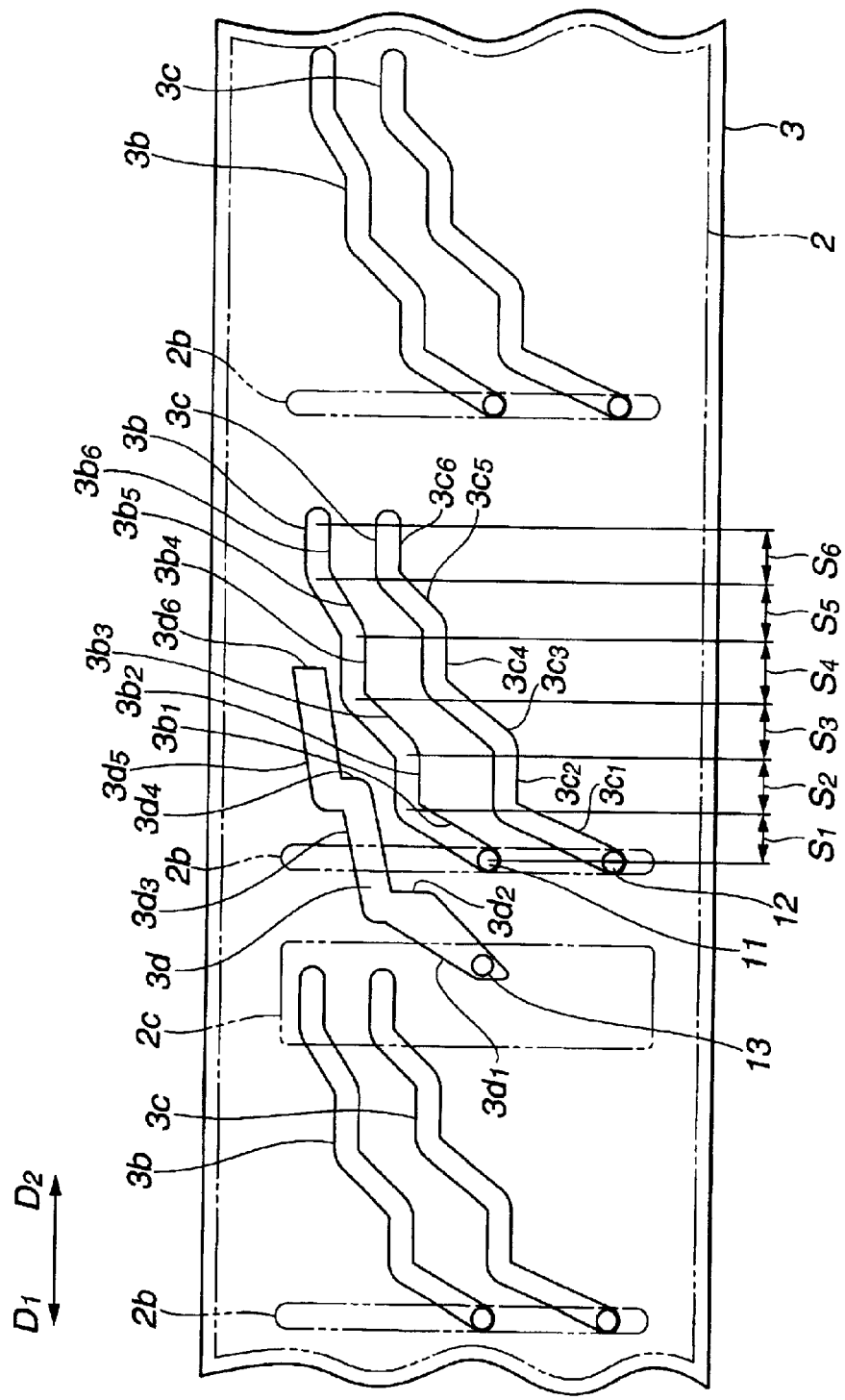

LENS DRIVING DEVICE

This application claims the benefit of Japanese Application No. 2000-361714 filed in Japan on Nov. 28, 2000, the contents of which are incorporated herein by reference.

BACKGROUND OF THE INVENTION

1. Field of the Invention

This invention relates to a lens driving device which performs movement and aperture opening and closing of a lens optical system in an optical device.

2. Description of the Related Art

The disclosure in Japanese Patent Laid-open No. 11-287941, regarding a lens driving device which performs movement and aperture opening and closing of a lens optical system, applied to electronic cameras, photoenlargers, and other optical equipment of the prior art, relates to a lens driving method which performs lens movement driving and aperture driving by means of a single driving source.

In the above conventional lens driving device, a dead zone portion is provided in the cam formed in the lens barrel. When the lens moves and is positioned in the above dead zone portion, the aperture is opened and closed by rotation of the above lens barrel. By reversing rotation of the lens barrel, moving the lens in the backward direction with the above aperture opening maintained, modification of the magnifying power, focus driving, and aperture opening and closing, can each be performed by a single driving source.

However, in the lens driving device disclosed in the above-mentioned Japanese Patent Laid-open No. 11-287941, when setting the aperture the lens must be returned to the initial position, and when combining an arbitrary aperture value with a specific lens position, a considerable time is required. Also, a driving plate must be used when performing aperture driving, so that the outer diameter of the lens barrel is increased, and there is the problem that the equipment in which the above device is incorporated increases in size.

SUMMARY OF THE INVENTION

This invention was devised in order to resolve the above-mentioned problems, and has as an object to provide a lens driving device which enables the setting of the combination of a prescribed zoom value and an arbitrary aperture value, by means of a simple configuration.

A lens driving device according to one aspect of this invention comprises a lens optical system having a moving lens group movable along a direction of an optical axis, and a focal length which can be altered in stages among a plurality of values; a moving lens group frame holding the moving lens group; an aperture device provided within the lens optical system and having an aperture value which can be modified; a single driving source for changing the focal length value of the lens optical system and the aperture value of the aperture device; and a driving member driven by the single driving source for performing driving to move the moving lens group frame to achieve a desired focal length value of the lens optical system from among the plurality of focal length values, and for then performing driving to change the aperture value of the aperture device while maintaining the desired focal length value; whereby the driving member is driven by the single driving source, and by this means the lens optical system is driven and the aperture device is driven.

Another lens driving system according to a second aspect of this invention comprises at least two moving lens group frames, each capable of different movement in an optical axis direction; an aperture device provided in one of the moving lens group frames; a cam member including: (i) at least two lens driving cams each having a first cam portion and a second cam portion that are formed successively to drive corresponding moving lens groups, and (ii) a third cam portion formed separately from the lens driving cams; and a single driving source for driving the cam member to drive and displace the moving lens group frames and to drive the aperture device for changing an aperture value; wherein the first cam portion is provided in a range in which the moving lens group frames are driven and displaced in the optical axis direction, the second cam portion is provided in a range in which the moving lens group frames are not driven and displaced in the optical axis direction, and the third cam portion drives the aperture device to change the aperture value when the moving lens group frames are in a state of not being displaced in the optical axis direction due to the moving lens group frames being in the range of the second cam portion; whereby the cam member is driven by the single driving source, and by this means the moving lens group frames are driven and the aperture device is driven.

Other features and advantages of this invention will become clear through the following explanation.

BRIEF DESCRIPTION OF THE DRAWINGS

FIG. 3 is an expanded view of the cam grooves of the fixed frame and cam ring comprised by the lens barrel of the above aspect;

DETAIL DESCRIPTION OF THE PREFERRED EMBODIMENTS

Hereafter, aspects of this invention are explained based on the drawings.

FIGS. 1 through 5 are used to explain a lens barrel incorporating the lens driving device of one aspect of this invention.

Note that as the rotation direction for operation in the following explanation, the clockwise direction as seen from the object side of the lens barrel (the lower side in FIG. 1; the counterclockwise direction as seen from the image-formation side), is taken to be the D1 direction, and the counterclockwise direction as seen from the object side (the clockwise direction as seen from the image-formation side) is taken to be the D2 direction. Moreover, the object side of the lens barrel in the optical axis direction is taken to be the forward direction, and the image-formation side of the lens barrel is taken to be the backward direction.

First, the above FIGS. 1 through 4C are used to explain the construction of the above lens barrel.

Figure 1:
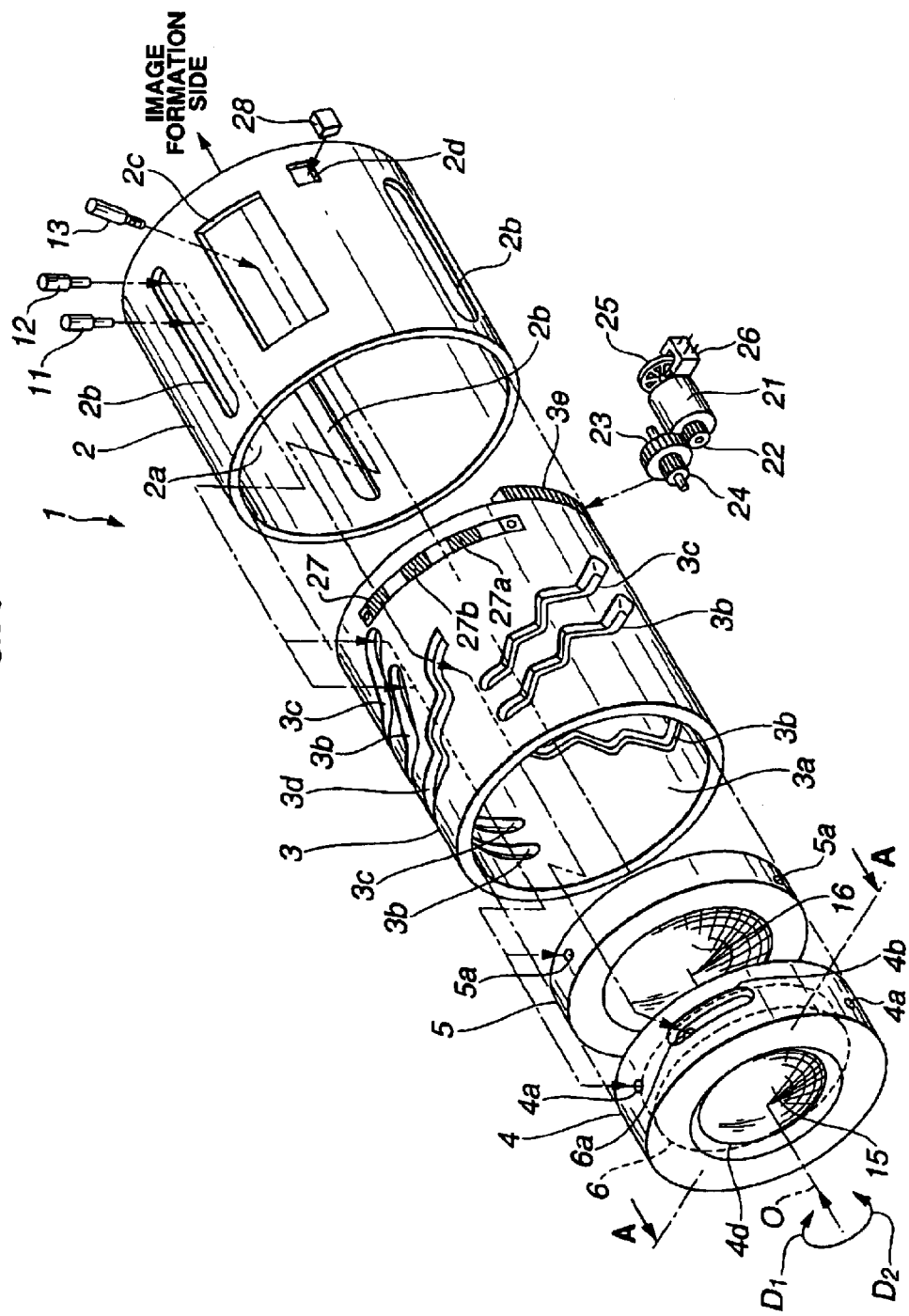
FIG. 1 is an exploded perspective view of the lens barrel into which is incorporated the lens driving device of one aspect of this invention.

As shown in FIG. 1, the lens barrel 1 of this aspect has a fixed frame 2; a cam ring 3 of cylindrical shape, as a driving means which is inserted in rotatable fashion into the inner surface 2a of the fixed frame 2; a first group lens frame 4, as a moving lens group frame which is inserted in relatively rotatable fashion into the interior of the cam ring 3; a second group lens frame 5, as a moving lens group frame which is likewise inserted in relatively rotatable fashion into the interior of the cam ring 3; a driving motor 21 as a single driving source which drives rotation of the cam ring 3 via a driving gear portion; a photoreflector (hereafter called "PR") 28 comprising an encoder for detection of the rotation position of the cam ring 3 and the lens position; and a photointerruptor (hereafter called "PI") for detection of the amount of rotation of the driving motor 21.

The above lens barrel 1 is incorporated into the electronic camera 60 (see FIG. 7); in this electronic camera 60, pickup processing control, and zooming and aperture driving control, are performed under control of a CPU (central processing unit) 31 which is a system controller used as a control means, as explained below. Additionally, in this electronic camera 60, the pickup system has a large depth of field, so that focusing driving is unnecessary.

Into the above fixed frame 2 are inserted the cam followers 11, 12 of the lens frames 4, 5, and in the fixed frame 2 are provided three straight grooves 2b which guide the cam followers in the direction of the lens optical axis O (hereafter called the optical axis), an opening 2c which serves as the escape portion of the aperture driving pin 13 of the aperture ring 6, and an opening 2d for mounting the PR 28.

Into the above cam ring 3 are inserted the above cam followers 11, 12, and in the cam ring 3 are provided three cam grooves (driving means, cam means) 3b, 3c to drive the motion of the cam followers in the direction of the lens optical axis O (hereafter called the optical axis), an aperture cam groove (driving means, cam means) 3d to drive the above aperture driving pin 13 in the direction of rotation about the optical axis O, and a gear portion 3e for rotation driving.

Moreover, reflective tape for detection of the cam ring rotation position is applied to the cam ring 3 along the outer periphery. The position of this reflective tape is detected by the PR 28, which is supported by the fixed frame 1. The output is input to the CPU 31, which will be described later, as an encoder output indicating the rotating position of the cam ring 3, and used in control of zoom driving, aperture driving, or the like.

Moreover, a gear 24 meshes with the gear portion 3e of the cam ring 3, and the above gear 24 meshes with a pinion 22 of a driving motor 21 via an integrally-formed gear 23. Hence the cam 3 is driven in rotation by the driving motor 21. The amount of rotation of the driving motor 21 is determined through detection, by the PI 26, of the rotation of a slit plate 25 fastened to a motor shaft, the output of which is input to the CPU 31, which will be described later.

A first group lens 15 as a moving lens group constituting a zoom lens is held by the above first group lens frame 4, and three cam followers 11 are fastened in three cam follower mounting holes 4a in the frame periphery. The above cam followers 11 are inserted in freely sliding fashion into the cam groove 3b of the cam ring 3 and into the straight groove 2b of the fixed frame 2. The aperture ring 6, which is an aperture device, is incorporated into the first group lens frame 4 so as to enable free rotation about the optical axis O (see FIG. 2). Six round holes, not shown, parallel to the lens optical axis O, are provided in the first group lens frame 4 in the vicinity of the opening 4d.

A second group lens 16 as a moving lens group constituting a zoom lens is held by the above second group lens frame 5, and three cam followers 12 are fastened in three cam follower mounting holes 5a in the frame periphery. The above cam followers 12 are inserted in freely sliding fashion into the cam grooves 3c of the cam ring 3, and into the straight grooves 2b of the fixed frame 2.

The above aperture ring 6 has a mounting hole 6a in its outer periphery, and in this mounting hole 6a is fastened an aperture driving pin 13 which is driven by the aperture cam groove 3d of the cam ring 3. The aperture ring 6 has an aperture opening 6e in its interior.

Moreover, the aperture ring 6 has six long holes 6b, directed radially from the center and penetrating in the plate thickness direction. Aperture blades 7 for opening and closing of the aperture opening 6e on the lens barrel image-formation side of the first group lens 15, with a six-blade configuration, are incorporated so as to be enclosed between the aperture ring 6 and the first group lens frame 4.

The above aperture blades 7 are fixed by two pins for each blade; of these, one blade pin 7a is rotatably inserted into one of the above round holes, and another blade pin 7b is inserted into one of the above long holes 6b provided in the above aperture ring 6, so as to enable sliding in the length direction.

The aperture driving pin 13 protrudes outward from the opening groove 4b of the first group lens frame 4; the aperture driving pin 13 is pressed by the pin contact surface of the aperture groove 3d of the cam ring 3, and due to rotation of the aperture ring 6, the aperture blades 7 move circularly about the blade pins 7a, to change the aperture opening.

A stopper 6c and a protrusion 6d are provided on the outer surface of the above aperture ring 6. On the other hand, a stopper 4c is provided on the inner surface of the first group lens frame 4. One end of an aperture ring impelling spring 9 lays across the above protrusion 6d, and the other end of the spring lays across the inner portion of the first group lens frame 4. Hence the aperture ring 6 is supported in a state of being impelled in the D2 direction with respect to the first group lens frame 4. In the open state of the aperture driving pin 13, the stoppers 4c and 6c are in contact, and in this state the aperture opening is minimum.

Figure 2:
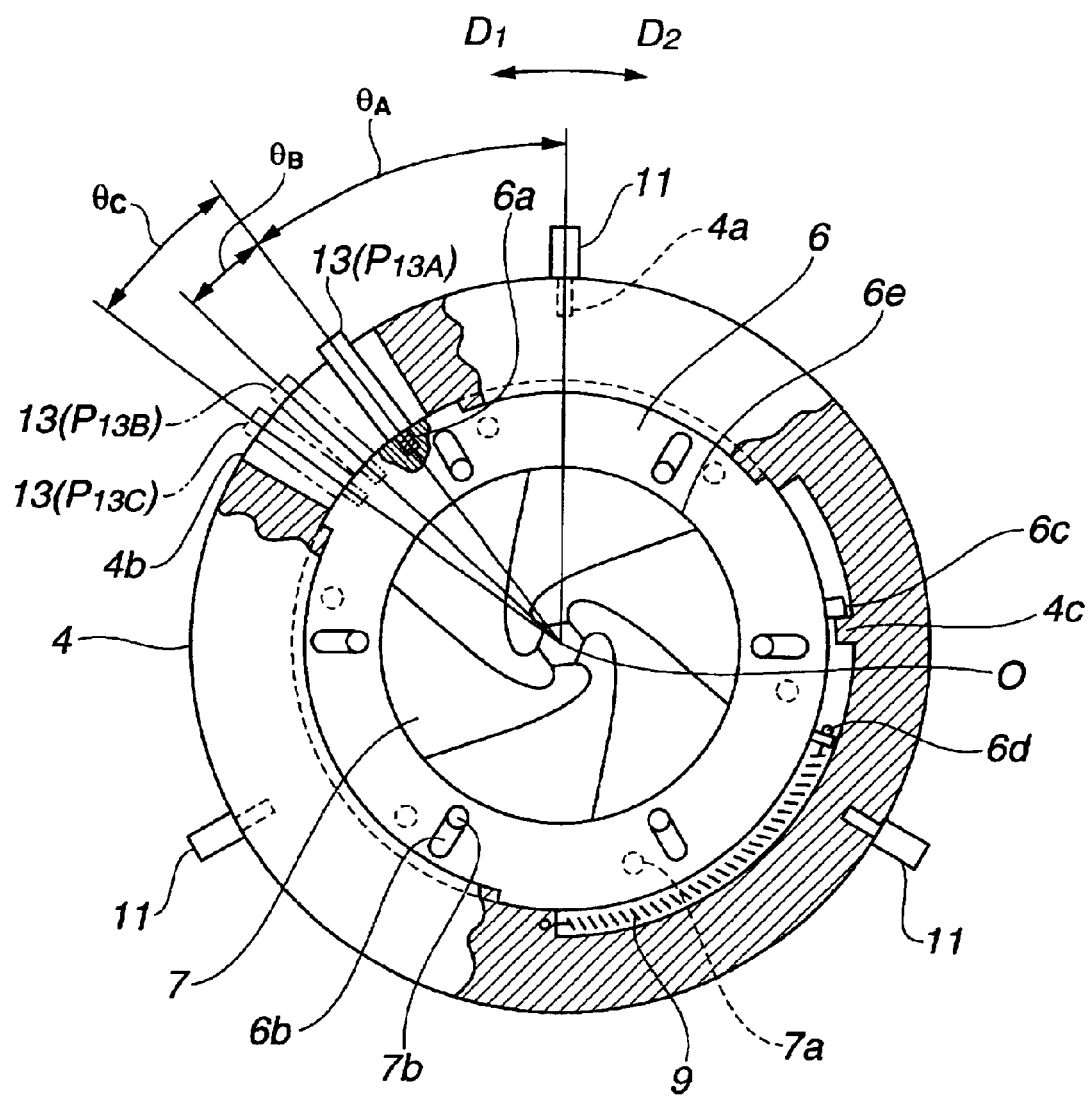
FIG. 2 is a cross-sectional view along line II—II in FIG. 1, and shows, as seen from the image-formation plane side, a first-group lens frame and aperture ring of the lens barrel of the above aspect.

In the open state of the above aperture driving pin 13, the cam follower 11 and aperture driving pin 13 of the first group lens frame 4 form an angle θA about the optical axis O, as shown in FIG. 2, and at this time the aperture ring 6 executes the minimum aperture to the aperture blades 7. When the aperture driving pin 13 is moved in the direction D1 by a maximum angular amount θC from the above angle θA, opposing the impelling force of the aperture impelling spring 9, the aperture ring 6 executes opening of the aperture. When the aperture driving pin 13 is at an angle θB between the above angle θA and the angle θC, the aperture ring 6 applies to the aperture blades 7 an aperture value of arbitrary magnitude between the minimum aperture and the open aperture.

The cam follower 11 of the first group lens frame 4, and the cam follower 12 of the second group lens frame 5, are respectively inserted in freely sliding fashion into the cam grooves 3b and 3c provided in the above cam ring 3.

Figure 5:
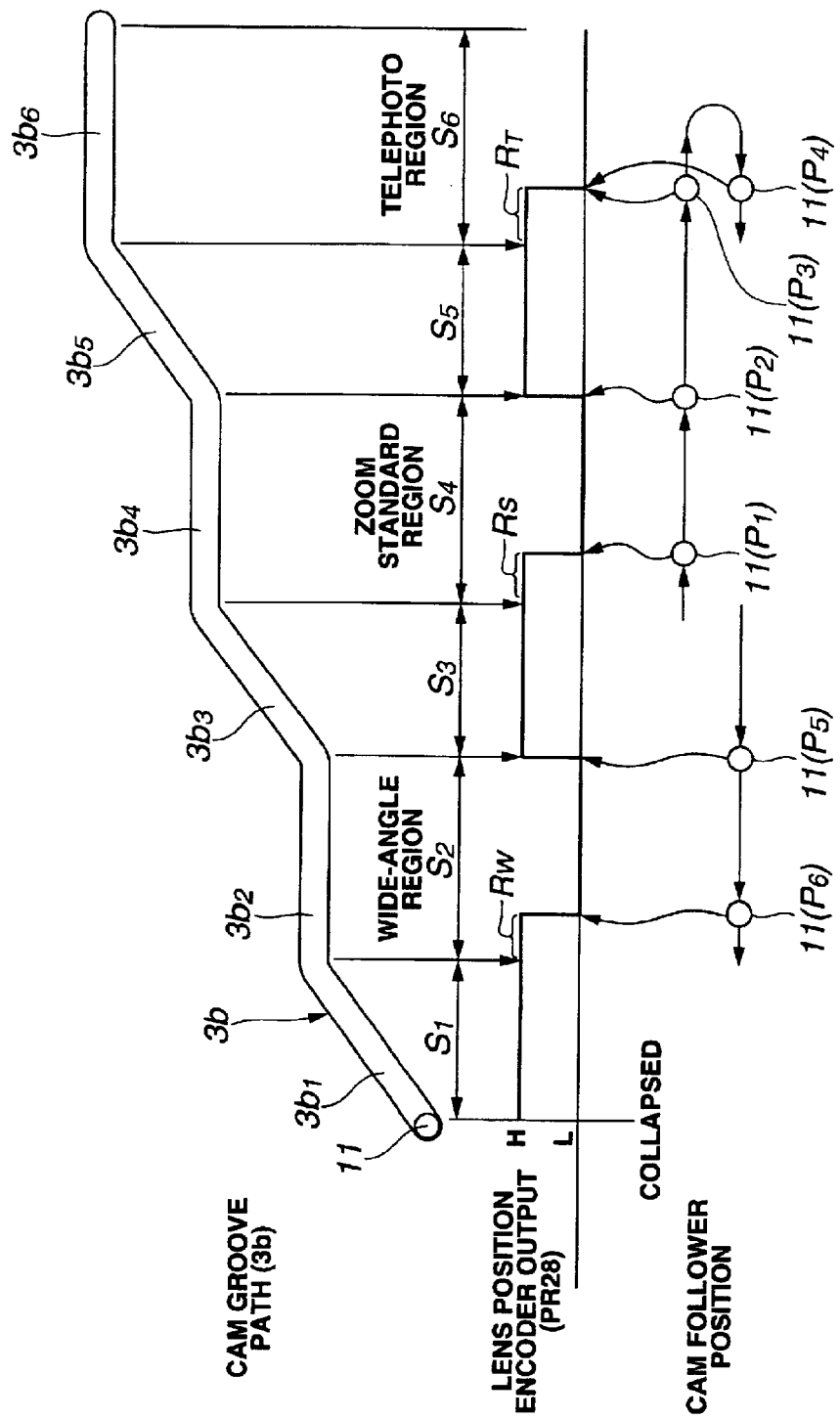
FIG. 5 is a figure showing the relation between the cam groove of the cam ring comprised by the lens barrel, and the encoder output, in the above aspect.

The above cam grooves 3b and 3c have oblique-travel cam grooves 3b1, 3c1, oblique-travel cam grooves 3b3, 3c3, and oblique-travel cam grooves 3b5, 3c5, as lens frame driving regions (first cam portion) for oblique travel with respect to the optical axis O in order to drive the first group lens frame 4 and second group lens frame 5 in the direction of the optical axis O, as shown in the cam groove expanded diagram of FIG. 3, and in FIG. 5, showing the relation between cam grooves and encoder output. The above cam grooves 3b, 3c also have circumferential-direction cam grooves 3b2, 3c2 in the wide-angle region S2, circumferential-direction cam grooves 3b4, 3c4 in the standard zoom region S4, and circumferential-direction cam grooves 3b6, 3c6 in the telephoto region S6, which are lens frame non-driving regions (second cam portions) formed by cam grooves, along the circumferential direction, which maintain a prescribed zoom position without driving the above two lens frames in the direction of the optical axis O. The pair of cam grooves 3b and 3c are formed successively, or by connecting, in alternation, the above diagonal cam grooves and circumferential-direction cam grooves.

Note that in the cam ring 3 there are provided the above pair of cam grooves 3b, and three pair of cam grooves 3c. FIG. 5 shows only the expanded shape of the cam groove 3b of the cam ring 3 into which is inserted the cam follower 11 to control and drive the first group lens frame 4; but the cam groove 3c of the cam ring 3 is also formed by having a diagonal cam groove with the same phase with respect to the rotation direction of the cam ring 3, and a circumferential-direction cam groove.

When the cam ring 3 is rotated in the direction D1 in a state in which the cam followers 11 and 12 of the lens frames 4, 5 are inserted into the above diagonal cam grooves of the cam grooves 3b, 3c of the cam ring 3, the cam followers 11 and 12 are guided in a straight line by the straight groove 2b of the fixed frame 2, and move in the direction of the optical axis O while varying the interval between them. The first group lens frame 4 and second group lens frame 5 are then extended from the collapsed position to the wide-angle position, or from the wide-angle position to the standard zoom position (zoom intermediate position), or from the standard zoom position to the telephoto position. When the cam ring 3 is rotated in the D2 direction, collapse in the direction opposite the above-described direction occurs.

Even if the cam ring 3 is rotated in the direction D1 or the direction D2 in a state in which the cam followers 11 and 12 of the lens frames 4, 5 are inserted into the above circumferential-direction cam grooves of the cam grooves 3b, 3c of the cam ring 3, the cam followers 11, 12 do not move in the direction of the optical axis O. The first group lens frame 4 and second group lens frame 5 are held at the wide-angle position, or at the standard zoom position, or at the telephoto position, while maintaining their prescribed interval, without moving forward or backward.

When the cam follower 11 of the first group lens frame 4 moves in relative sliding motion along the cam groove 3b of the above cam ring 3, with the cam follower 11 at the collapsed position-side of the wide-angle region S2 (circumferential-direction cam groove 3b2), standard zoom region S4 (circumferential-direction cam groove 3b4), or telephoto region S6 (circumferential-direction cam groove 3b6) of the cam groove 3b, the encoder output of PR 28 changes from "H" (high-output level) to "L" (low-output level), as shown in the diagram in FIG. 5 of the relation between the cam groove and encoder output. When the cam follower 11 reaches the ends of the wide-angle region S2 or standard zoom region S4 of the cam groove 3b near the telephoto position, the encoder output of PR 28 changes from "L" to "H".

Moreover, as shown in FIG. 5, the region between the end of the wide-angle region S2 (circumferential-direction cam groove 3b2) of the cam groove 3b near the collapsed position, and the transition point at which the encoder output of the above PR 28 changes from "H" to "L", is taken to be the wide-angle stopping region RW.

The region between the end of the standard zoom region S4 (circumferential-direction cam groove 3b4) of the cam groove 3b near the collapsed position, and the transition point at which the encoder output of the above PR 28 changes from "H" to "L", is taken to be the standard zoom stopping region RS.

The region between the end of the telephoto region S6 (circumferential-direction cam groove 3b6) of the cam groove 3b near the collapsed position, and the transition point at which the encoder output of the above PR 28 changes from "H" to "L", is taken to be the telephoto stopping region RT.

Immediately after zoom wide-angle driving by the cam ring 3, or in the state before or after aperture driving, the cam follower 11 is stopped in the above wide-angle stopping region RW.

Immediately after standard zoom driving by the cam ring 3, or in the state before or after aperture driving, the cam follower 11 is stopped in the above standard zoom stopping region RS.

Immediately after zoom telephoto driving by the cam ring 3, or in the state before or after aperture driving, the cam follower 11 is stopped in the above telephoto stopping region RT.

On the other hand, the aperture driving pin 13 of the first group lens frame 4 is inserted into the aperture cam groove 3d provided in the above cam ring 3; as shown in the expanded view of FIG. 3, in this aperture cam groove 3d are provided diagonal-travel escape portions 3d1, 3d3, 3d5, and pin-contact faces 3d2, 3d4, 3d6 which are faces parallel to the optical axis O with which the aperture driving pin 13 can make contact.

The aperture driving pin 13 of the aperture ring 6 supported by the first group lens frame 4 is inserted into the above aperture cam groove 3d. When the first group lens frame 4 is in any of the above wide-angle position, standard zoom position, or telephoto position states, the aperture ring 6 is, together with the first group lens frame 4, in the same extension position. Hence the aperture driving pin 13 is in a position enabling contact with the pin-contact faces 3d2, 3d4, 3d6 of the aperture cam groove 3d. If, in this state, the cam ring 3 is driven in rotation in the direction D1, the aperture driving pin 13 is moved pressing against one of the pin contact faces 3d2, 3d4, 3d6. By means of this pressing movement of the aperture driving pin 13, the aperture ring 6 is rotated in the direction D1 relative to the first group lens frame 4. By means of this rotation, the aperture value is changed.

Figure 4A:
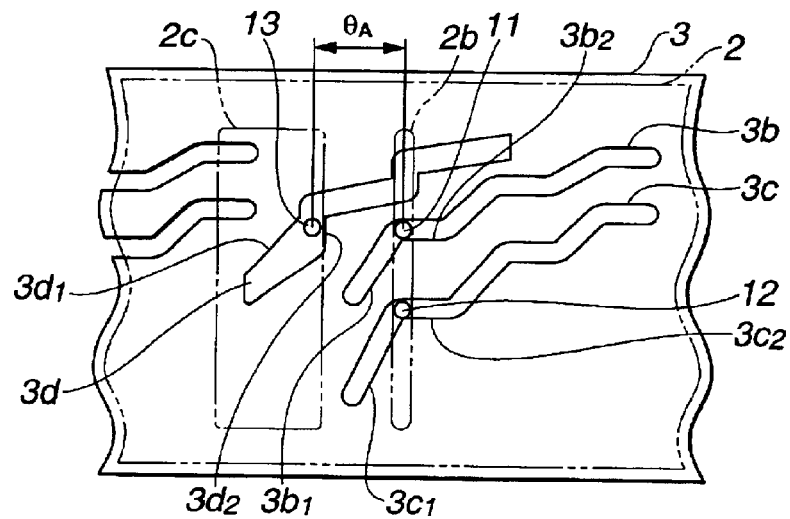
FIG. 4A is an expanded view of a state of operation showing a state in which the cam follower of the lens frame and the aperture driving pins of the aperture ring are driven by the cam ring comprised by the lens barrel of the aspect of the above FIG. 1, and shows a state in which the cam follower has reached the wide-angle stopping region.
Figure 4B:
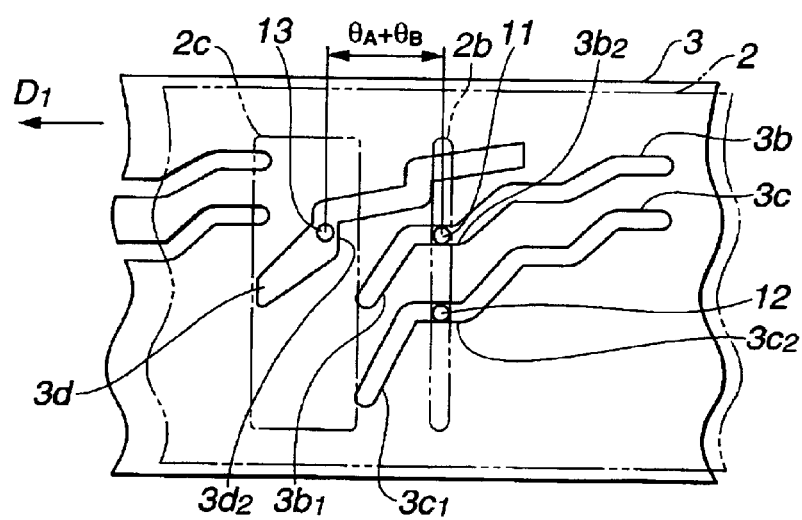
FIG. 4B is an expanded view of a state of operation showing a state in which the cam follower of the lens frame and the aperture driving pins of the aperture ring are driven by the cam ring comprised by the lens barrel of the aspect of the above FIG. 1, and shows a state in which the aperture driving pins have reached an arbitrary aperture position.
Figure 4C:
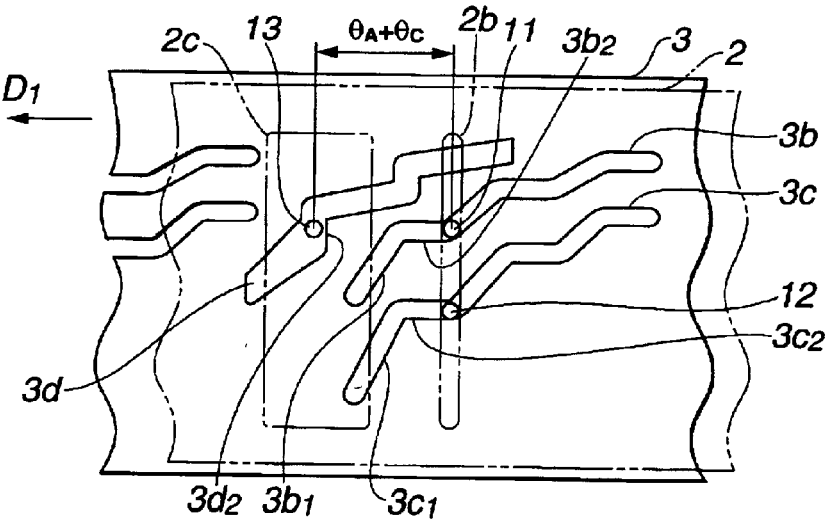
FIG. 4C is an expanded view of a state of operation showing a state in which the cam follower of the lens frame and the aperture driving pins of the aperture ring are driven by the cam ring comprised by the lens barrel of the aspect of the above FIG. 1, and shows a state in which the aperture driving pins have reached the aperture-open position.

Next, the aperture driving operation of the aperture ring 6 by the aperture driving pin 13 is explained in detail, for the example of the zoom wide-angle state, using the expanded views of operating states in FIGS. 4A, 4B and 4C. When the cam ring 3 is driven in rotation in the D1 direction from the state in which both the first group lens frame 4 and the second group lens frame 5 are in the collapsed position (see FIG. 3), the cam followers 11, 12 move in the forward direction by means of the diagonal cam grooves 3b1, 3c1 of the cam grooves 3b, 3c, to arrive at the wide-angle stopping region RW at the ends of the circumferential-direction cam grooves 3b2, 3c2 (see FIG. 4A). At this time, the first group lens frame 4 and the second group lens frame 5 are extended to the wide-angle position. On the other hand, the aperture driving pin 13 of the aperture ring 6 moves forward together with the cam follower 11 along the escape portion 3d1 of the aperture cam groove 3d, to be positioned on the side of the pin contact face 3d2 of the aperture cam groove 3d (see FIG. 4A).

When the cam ring 3 is then rotated in the D1 direction, so that the cam ring 3 is rotated by a prescribed angle with reference to the transition point (P6 in FIG. 5) at which the encoder output of PR 28 changes from "H" to "L", the pin contact face 3d2 makes contact with the aperture driving pin 13. In this state, the cam follower 11 and aperture driving pin 13 form an angle θA (see FIG. 2), and the aperture state of the aperture blades 7 of the aperture ring 6 are in the minimum aperture opening state.

Next, if the cam ring 3 is rotated by an arbitrary angle in the D1 direction according to a prescribed aperture value, the aperture driving pin 13 is pressed by the pin contact face 3d2, and moves in rotation in the D1 direction. In this state, the cam follower 11 and aperture driving pin 13 form an angle (θA+θB), and the aperture state of the aperture blades 7 of the aperture ring 6 assumes an arbitrary prescribed aperture value between the minimum and open aperture states (see FIG. 4B). In this state, image pickup is performed. After image pickup, the cam ring 3 is rotated in the D2 direction, and the cam followers 11, 12 are returned to the original wide-angle stopping region RW.

When fully opening the aperture, the cam ring 3 is further rotated in the D1 direction by a prescribed angle, and when the cam followers 11, 12 reach the vicinity of the ends of the cam grooves 3b2, 3c2, the cam follower 11 and aperture driving pin 13 form an angle (θA+θC), and the aperture state of the aperture blades 7 of the aperture ring 6 are in the open state (see FIG. 4C). After execution of image pickup, the cam ring 3 is rotated in the D2 direction, and the cam followers 11, 12 are returned to the original wide-angle stopping region RW.

Note that during the above-described aperture driving, the first group lens frame 4 and second group lens frame 5 remain held in the wide-angle position.

In a state in which the first group lens frame 4 and second group lens frame 5 is zoomed-up to a position other than the above wide-angle position, that is, to the standard zoom position or the telephoto position, or is zoomed-down from another zoom position, aperture driving similar to the above-described operation is performed.

That is, in a state in which the cam followers 11, 12 are in a zoom stopping region, by similarly rotating the cam ring 3 in the direction D1, and rotating the aperture ring 6 through a prescribed angle with respect to the lens frame 4, the above-described aperture operation is executed. After execution of the image pickup operation, the cam ring 3 is rotated to return the cam follower 11 to the stopping region RS or RT or the other region which is the stopping region corresponding to each zoom position, returning the aperture to the minimum aperture. In this state, the next zoom driving, aperture driving, image pickup or other operation is awaited.

Note that the cam groove escape portions 3d1, 3d3, 3d5 of the aperture cam groove 3d shown in FIGS. 3, 4A, 4B or 4C need not completely escape from the aperture driving pin 13. It is because varied aperture during zoomed-up or zoomed-down operation in a lens optical system does not cause a serious problem.

Figure 6:
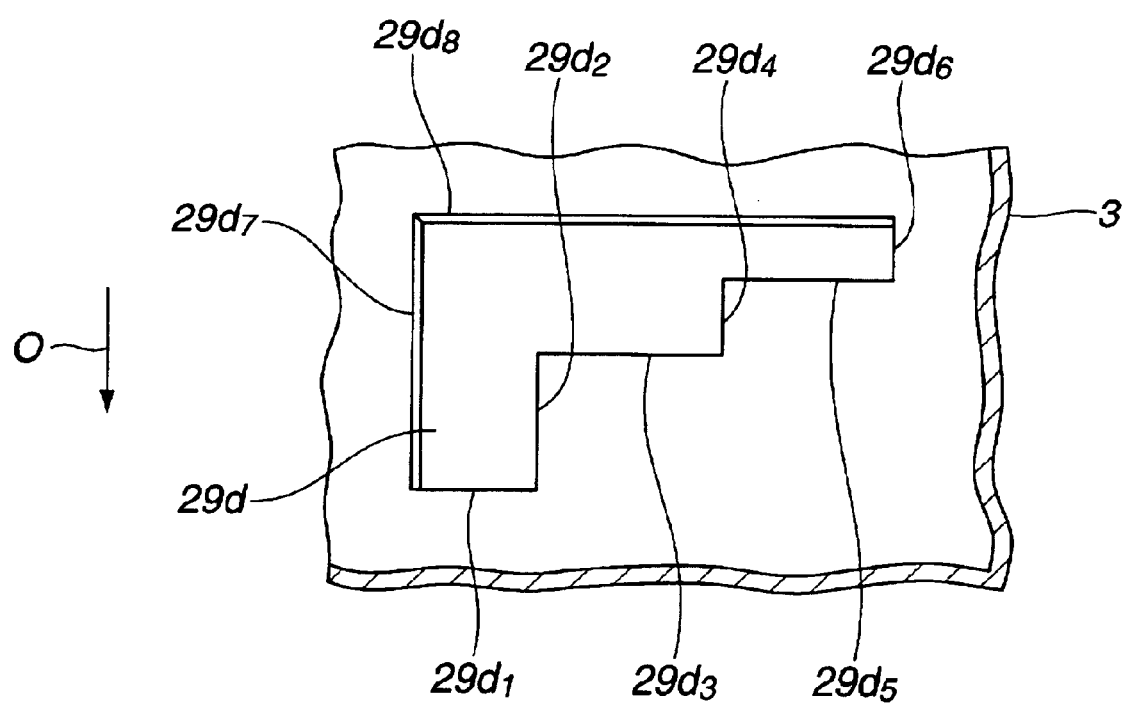
FIG. 6 is an expanded view of an aperture cam groove which is a modification of the aperture cam groove provided in the cam ring comprised by the lens barrel in the aspect of the above FIG. 1.

Note that the cam groove escape portions 3d1, 3d3, 3d5 of the aperture cam groove 3d which provide in the cam ring 3 need not necessarily be cam faces performing diagonal travel as shown in FIG. 3, but may be of a shape resulting in escapement from the movement position of the aperture driving pin 13 resulting from extension operation of the first group lens frame 4. For example, as shown in FIG. 6, the aperture cam groove 29d may be formed from faces parallel to the optical axis O, an escape portion 29d having escape portions 29d1, 29d3, 29d5, 29d7, 29d8 formed from orthogonal faces, and pin contact faces 29d2, 29d4, 29d6.

Figure 7:
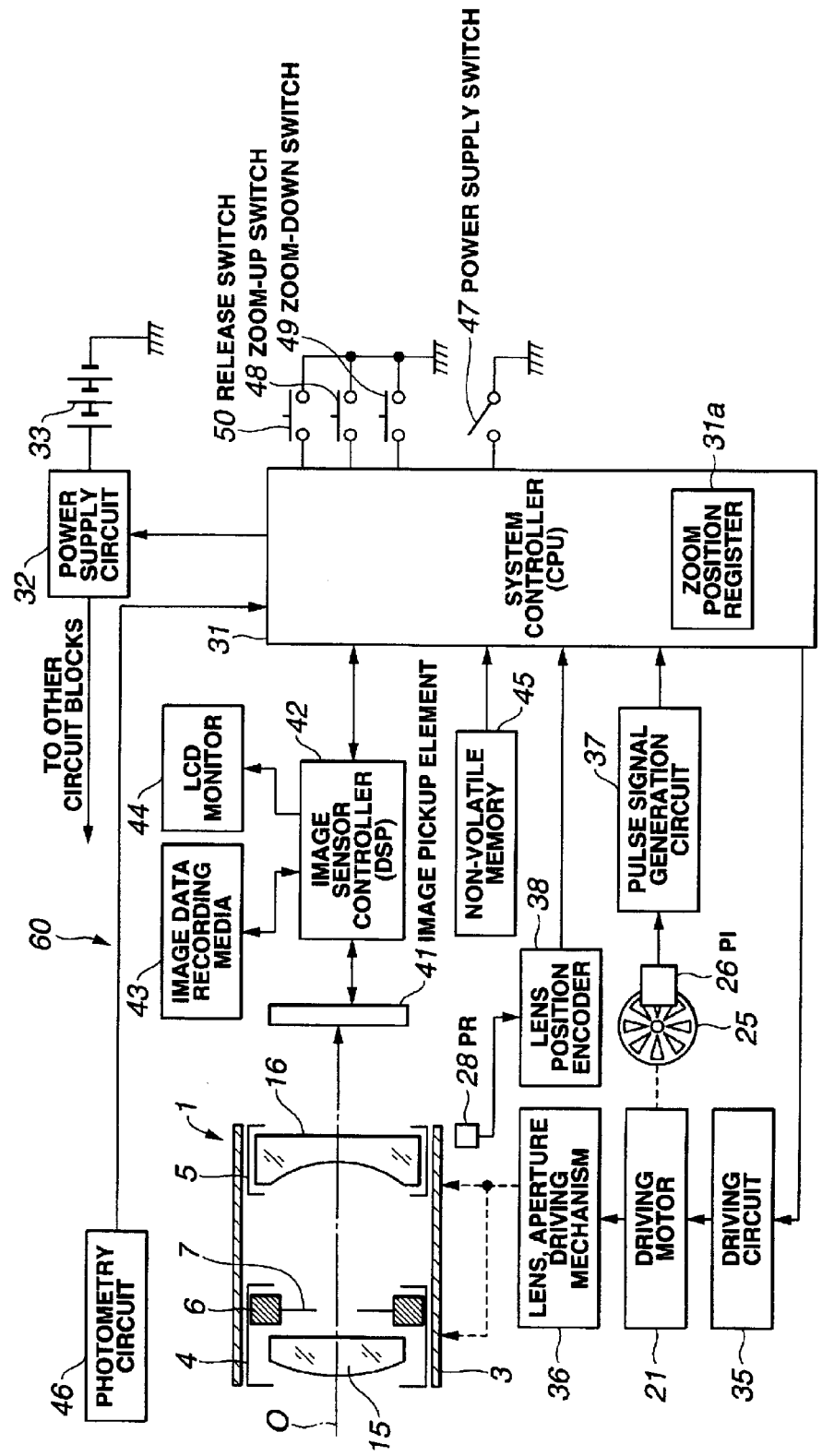
FIG. 7 is a block diagram of an electronic camera incorporating the lens barrel of the aspect of the above FIG. 1.

The configuration of an electronic camera incorporating the above-described lens barrel 1 is next explained, using the block diagram of FIG. 7.

As shown in FIG. 7, the above electronic camera 60 comprises a CPU 31 as the system controller performing control of the entire camera; the above-described lens barrel 1, incorporating a pickup lens and aperture device in order to capture the image of an object; a pickup element 41 which converts an object image captured by the first and second group lenses 15, 16 of the lens barrel 1 into electrical signals; and other control elements for image pickup, described below.

As already stated, the above lens barrel 1 has a first group lens frame 4 which holds a first group lens 15, and a second group lens frame 5 which holds a second group lens 16; an aperture ring 6 having aperture blades 7 (see FIG. 2) is incorporated into the above first group lens frame 4.

The above two lens frames 4, 5 and aperture blades 7 are driven under control by a driving motor 21, which is a single driving source, via a lens/aperture driving mechanism 36 comprising the cam grooves of a cam ring 3, cam followers or the like. A slit plate 25 is mounted onto the output shaft of the driving motor 21. By means of PI 26 positioned near the slit plate 25, an output signal corresponding to the rotation of the slit plate 25 is obtained. This output signal is converted into a pulse signal by a pulse signal generation circuit 37, and is input to the CPU 31. Power is supplied to the above driving motor 21 via a driving circuit 35.

The CPU 31 drives the driving motor 21 with the required number of rotations, by controlling the driving circuit 35, while detecting pulse signals from PI 26. This driving motor 21 drives rotation of the cam ring 3, driving the first and second group lens frames 4, 5 and the aperture ring 6, to perform driving under control of zooming (changes in magnifying power) and aperture opening and closing.

In order to precisely position the first and second group lens frames 4, 5, a lens position encoder is provided to detect the position of the cam ring 3, and in addition the amount of driving of the above driving motor 21 is detected by means of pulse signals from PI 26 and used.

The above lens position encoder comprises reflective tape 27 applied to the periphery of the above-described cam ring 3, and a PR (photoreflector) 28 which is an optical sensor to detect reflective portions 27a and non-reflective portions 27b of the reflective tape 27 fastened to the fixed frame 2.

By means of the encoder output which is the output signal of the above PR 28, the zoom rotation reference position of the cam ring 3 (the encoder output transition points P1 to P6 shown in FIG. 5), and therefore the wide-angle position, standard zoom position, and telephoto position of the lens frames 4, 5 can be known with rough precision (see FIG. 5). The detection precision is rough, but because there is no effect of play or backlash, the relation between the lens frame positions and the encoder output does not change. However, as explained below, the relation between the wide-angle position, standard zoom position and telephoto position and the encoder output will vary slightly among cameras due to manufacturing tolerances, and so data for the correspondence relations for each camera is written to non-volatile memory (EEPROM) 45. Detection of the rotation reference position of the cam ring 3 in each zoom state is performed based on this correspondence relation data.

By controlling the driving motor 21 using the pulse signals of the above PI 26 and the encoder output of the PR 28, the CPU 31 can control the positions of the lens frames 4, 5 with a desired precision. The above output encoder has great significance for aperture control, discussed below.

Control parameters necessary for control of the camera system are stored in the non-volatile memory 45, comprising EEPROM or the like; this parameter information is input to the CPU 31 as necessary.

The photometry circuit 46 is a circuit for detection of the brightness of the object; its output is input to the CPU 31.

An image sensor controller 42 comprises a DSP (digital signal processor) or the like, and controls an image pickup element (image sensor) 41 based on instructions from the CPU 31. The above DSP converts image data input from the pickup element 41 into a prescribed format, and stores the converted image data in image-data recording media 43 comprising flash ROM, a hard disk drive, a floppy disk drive or the like.

An LCD monitor 44 is controlled by the image sensor controller 42, and comprises an LCD display unit which displays images using image data. A power supply circuit 32 is a circuit for supplying the power of a power supply unit 33 to different circuit blocks comprised by the system, and operates based on control signals from the CPU 31.

The CPU 31 is connected to a number of switches (hereafter, switches are called "SW"), such as a power supply SW 47, zoom-up SW 48, zoom-down SW 49, release SW 50 or the like. When the above power supply SW 47 is turned on, the CPU 31 supplies power to each circuit block of the system, and the camera is put into a state in which operation is possible. When the power supply SW 47 is turned off, the power supply is shut off, and a state in which operation is disabled is entered. When the above zoom-up SW 48 is turned on, the CPU 31 exercises control to change the focal length of the image pickup lenses from wide-angle to a long focal length. When the above zoom-down SW 49 is turned on, the CPU 31 exercises control to change the focal length of the image pickup lenses from a long focal length to a wide-angle focal length. When the above release SW 50 is turned on, the CPU 31 begins image pickup operation.

Figure 11:
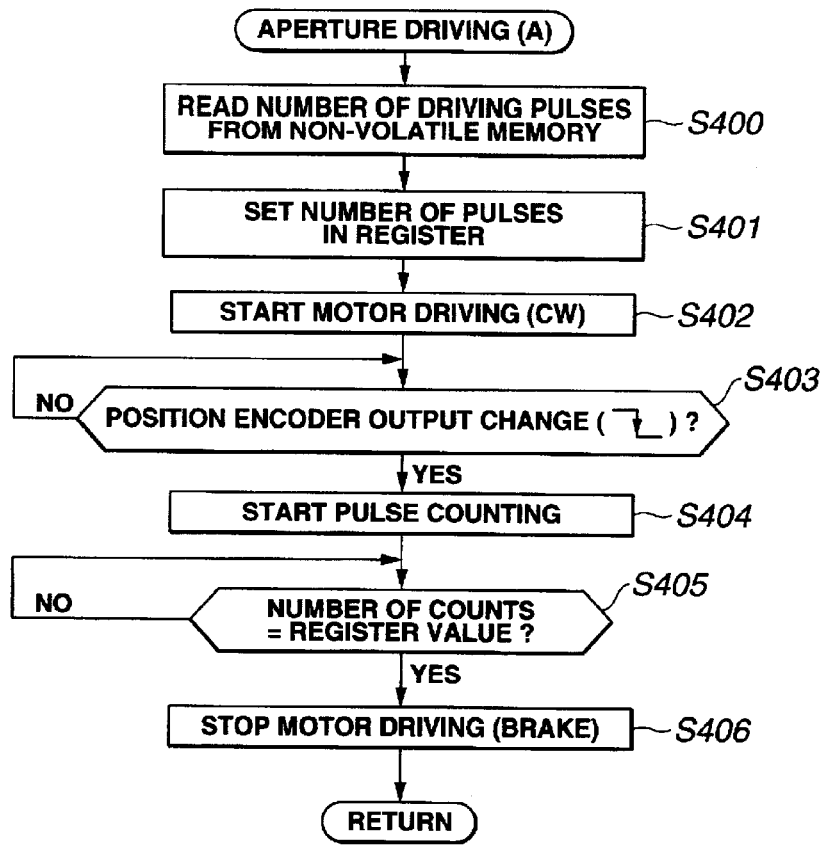
FIG. 11 is a flowchart of the "aperture driving (A)" subroutine called in the main routine of the above FIG. 8.
Figure 12:
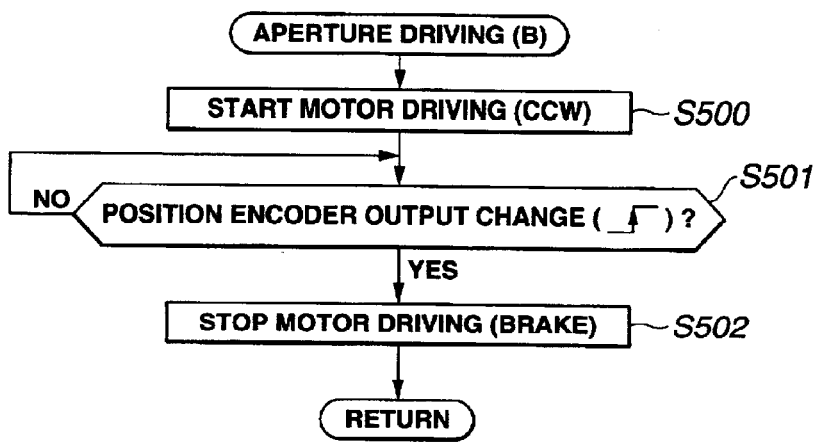
FIG. 12 is a flowchart of the "aperture driving (B)" subroutine called in the main routine of the above FIG. 8; and, FIG. 13 is a diagram of the aperture characteristic in an electronic camera incorporating the lens barrel of the aspect of the above FIG. 1.
Figure 13:
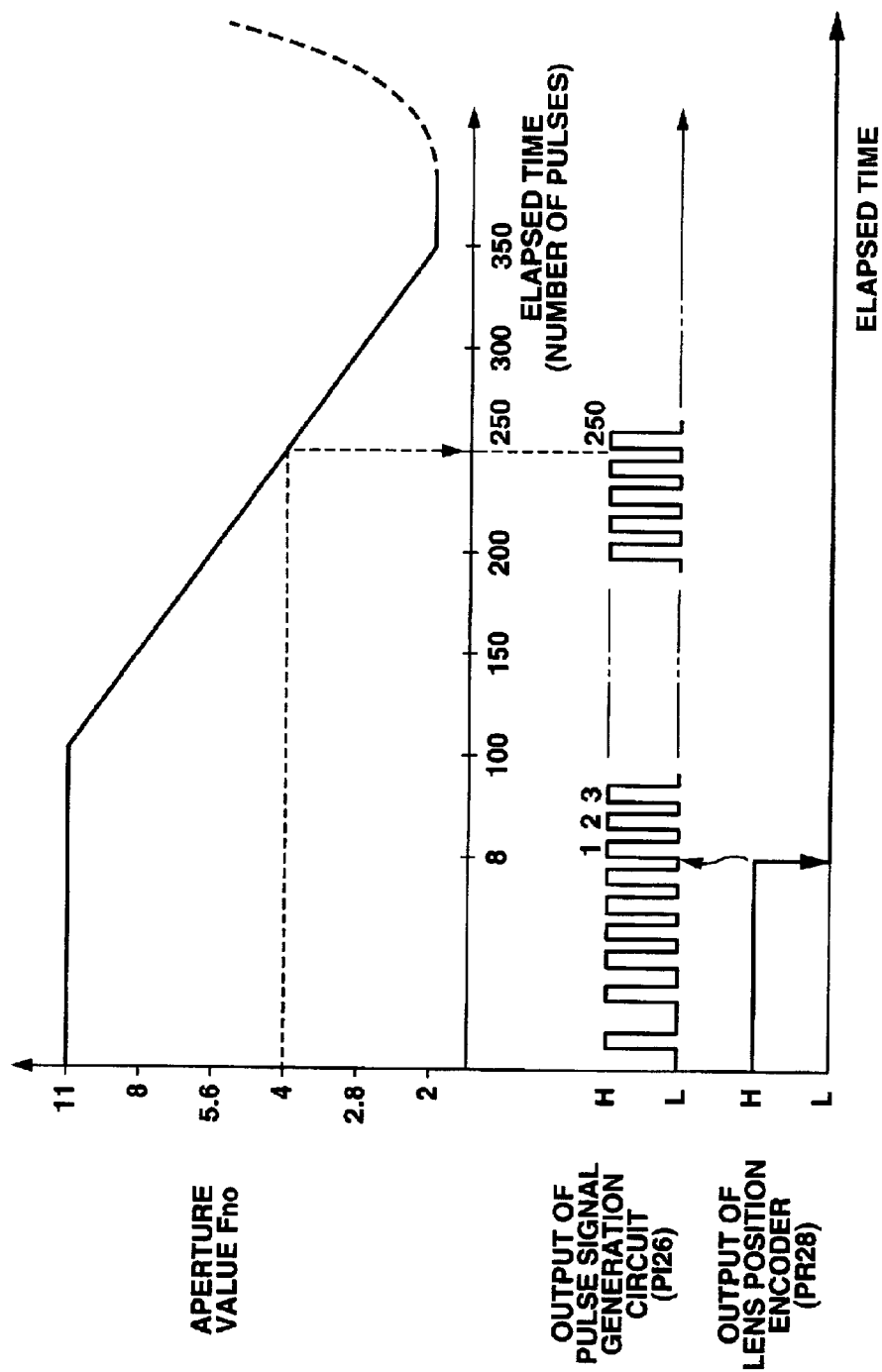

Next, image pickup operation of the electronic camera 60 of the aspect with the above-described configuration is explained, using the flowcharts of FIGS. 8 through 12, the diagram of the relation between the cam groove and encoder output of FIG. 5, and the diagram of the aperture characteristic of FIG. 13.

Figure 8:
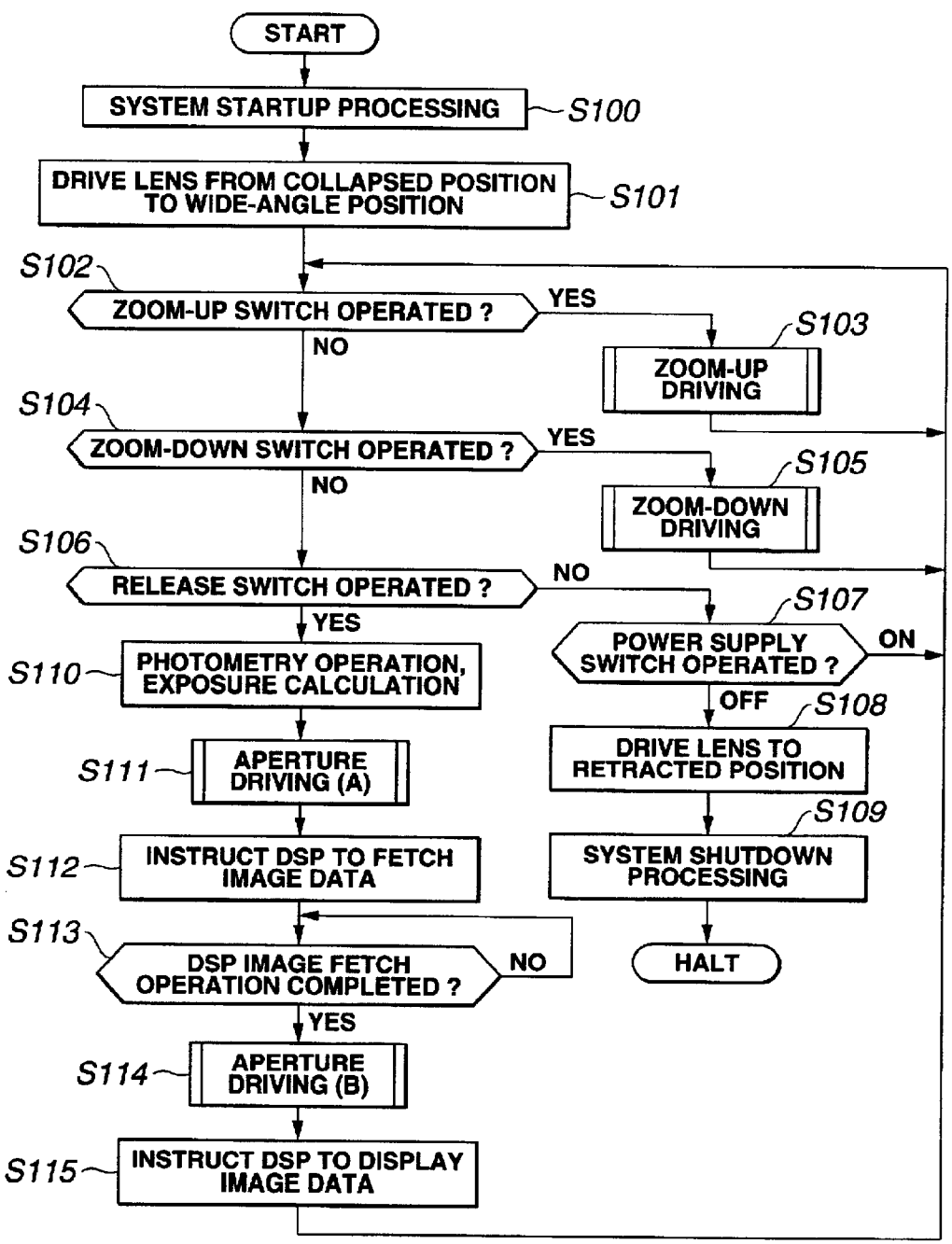
FIG. 8 is a flowchart of the main routine of pickup processing in an electronic camera incorporating the lens barrel of the aspect of the above FIG. 1.
Figure 9:
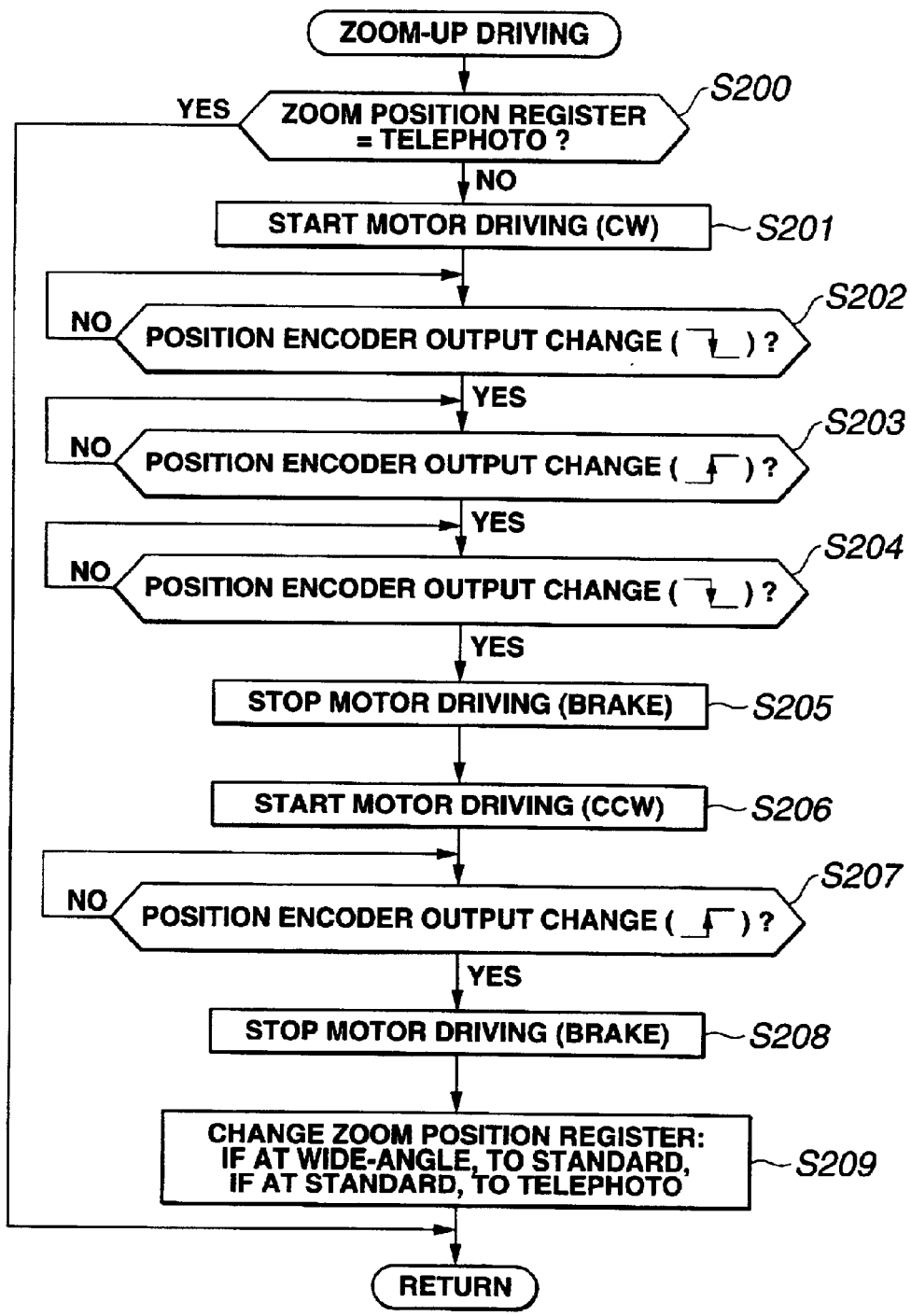
FIG. 9 is a flowchart of the "zoom-up driving" subroutine called in the main routine of the above FIG. 8.
Figure 10:
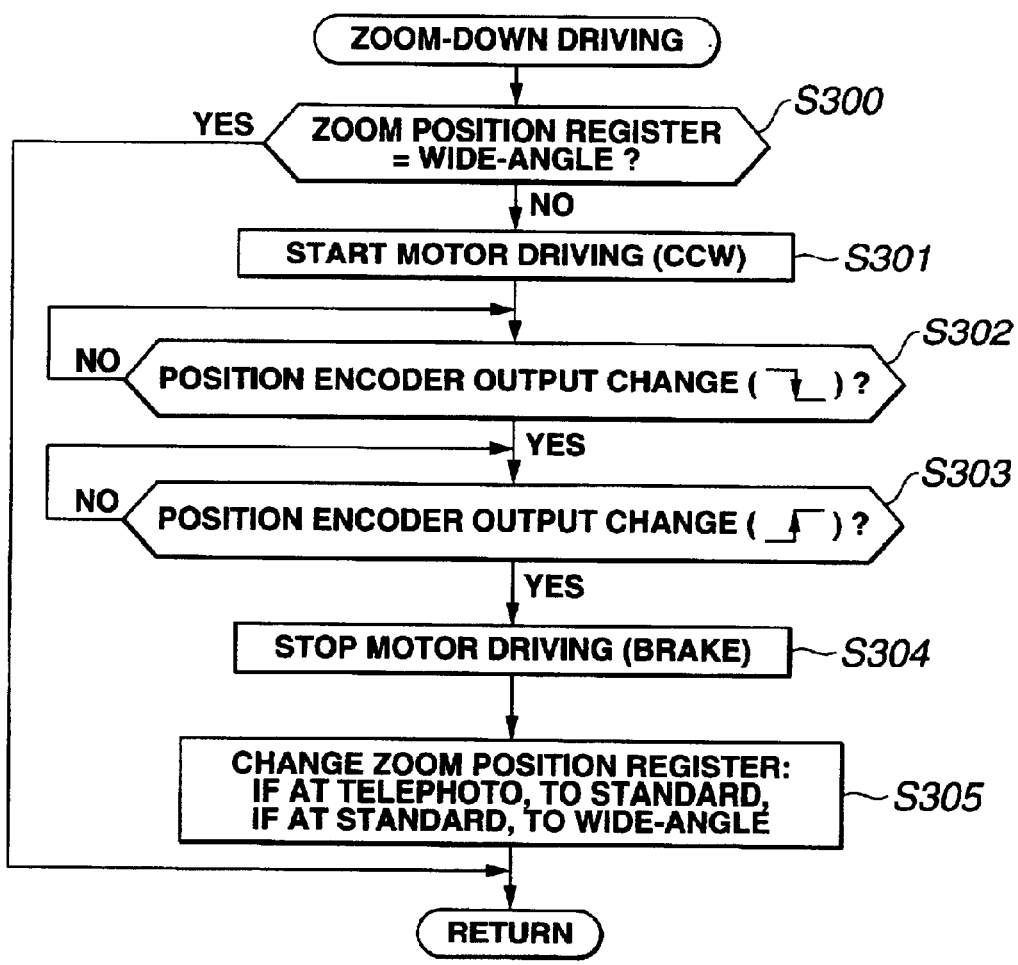
FIG. 10 is a flowchart of the "zoom-down driving" subroutine called in the main routine of the above FIG. 8.

Note that FIG. 8 is a flowchart of the main routine of image pickup processing. FIG. 9 is a flowchart of the "zoom-up driving" subroutine called by the above main routine. FIG. 10 is a flowchart of the "zoom-down driving" subroutine called by the above main routine. FIG. 11 is a flowchart of the "aperture driving (A)" subroutine called by the above main routine. FIG. 12 is a flowchart of the "aperture driving (B)" subroutine called by the above main routine.

In the main routine and subroutine processing operations of the above FIGS. 8 through 12, all processing is executed under control of the CPU 31. When the power supply SW 47 is turned on, the main routine of FIG. 8 is started, and the CPU 31 starts control operations. First, in step S100 system startup processing is performed. In this startup processing, the power supply circuit 32 is controlled to supply power to the circuit blocks comprised by the system. Also, each circuit is initialized.

In step S101, the driving motor 21 is driven under control, and the image pickup lenses (first and second group lenses 15, 16) are driven from the collapsed position to the wide-angle position via the cam ring 3. In step S102, the state of the zoom-up SW 48 is detected. If there is no operation of the zoom-up SW 48 (if it is turned off), execution proceeds to step S104. If the zoom-up SW 48 is operated, and is detected to be turned on, execution proceeds from step S102 to step S103, and the "zoom-up driving" subroutine described below is executed.

Note that in the example of the camera of this aspect, the above image pickup lenses can be operated to change the magnifying power in three stages: wide-angle, standard zoom, and telephoto; when the above "zoom-up driving" processing is executed, the magnifying power is changed by one stage toward the telephoto side (longer focal point side).

When the zoom-up SW 48 is off and execution proceeds from step S102 to S104, the state of the zoom-down SW 49 is detected. If there is no operation of the zoom-down SW 49 (if it is off), execution proceeds to step S106. If the zoom-down SW 49 is detected to be on, execution proceeds to step S105.

In step S105, the "zoom-down driving" subroutine, described below, is executed. When this "zoom-down driving" processing is executed, the magnifying power is changed by one stage toward the wide-angle side (shorter focal length side).

In step S106, the state of the release SW 50 is detected. If the release SW 50 is operated (when it is turned on), execution proceeds to step S110; if the release SW 50 is not operated (if it is off), execution proceeds to step S107.

If execution proceeds to step S107, the state of the power supply SW 47 is again detected. If the power supply SW 47 is on, execution returns to step S102 in order to continue camera image pickup operation. If the power supply SW 47 is off, execution proceeds to step S108, and the image pickup lenses are driven to the collapsed position. In step S109, system shutdown processing is performed, the power supply to each of the control elements is stopped, and the CPU 31 enters the HALT state (operation-stopped state).

If execution proceeds to step S110, exposure calculations are performed based on an object brightness information input from a photometry circuit 46. In exposure calculations, the pickup lens aperture setting is determined. Then, in step S111, the "aperture driving (A)" subroutine, described below, is executed, and the cam ring 3 is driven such that the aperture of the lens barrel 1 assumes the aperture setting determined in the exposure calculations of the above step S110.

Next, execution proceeds to step S112, and the CPU 31 issues an instruction for input to the DSP of the image sensor controller 42 of image data for the object image. In step S113, completion of image data input to the DSP is awaited. In step S114, the "aperture driving (B)" subroutine, described below, is executed. In this subroutine, the cam ring 3 of the lens barrel 1 is rotated, to restore the aperture state and lens frame state prior to execution of the "aperture driving (A)" subroutine. Then, in step S115 an instruction is issued to the DSP to display the captured image data on the LCD monitor. Then, execution returns to the above step S102.

Next, details of processing operations of the above-mentioned "zoom-up driving" subroutine are explained, using the flowchart of FIG. 9.

This subroutine is also executed under the control of the CPU 31. First, in step S200 the contents of a zoom position register 31a, allocated in part of the memory of the CPU 31, are referenced. This zoom position register 31a stores either wide-angle, standard zoom, or telephoto position information relating to the zoom position of the first and second group lenses 15, 16 of the first and second group lens frames 4, 5, that is, the current pickup lens. If the information in the above zoom position register 31a is the information on the telephoto position, the pickup lenses cannot be driven, and so execution returns to the main routine without change. Unless it is the information on the telephoto position, pickup lens zoom-up driving is possible, and execution proceeds to step S201. In the following explanation, it is assumed that the current pickup lens position is the standard zoom position, and processing in step S201 and subsequent steps is explained referring to FIG. 3 and FIG. 5.

The above FIG. 5 shows the relation between the cam groove and the output of the lens position encoder, that is, the relation between the encoder output due to the reflective and non-reflective portions of the reflective tape 27, and the cam groove position at which the cam follower 11 is positioned. This FIG. 5 shows only the expanded shape of the cam groove 3b of the cam ring 3 into which the cam follower 11 of the lens frame 4 is inserted; but as shown in FIG. 3, diagonal cam grooves and circumferential-direction cam grooves with the same phase in the rotation direction are also formed in the cam groove 3c of the cam ring 3, into which is inserted the cam follower 12 of the lens frame 5.

As shown in FIG. 3 and FIG. 5, in a state in which the cam followers 11, 12 are in relative motion in the circumferential-direction cam grooves of the wide-angle, standard zoom, and telephoto regions S2, S4, S6 of the cam grooves 3b, 3c in the cam ring 3, the focal length of the pickup lenses do not change even if the driving motor 21 is driven. That is, the state is a fixed-zoom state.

When changing the pickup lens aperture value, the change must be performed in the above fixed-zoom state. For example, in a state in which the pickup lenses are in the standard zoom position, the focal length can be regarded as the standard zoom, regardless of where the pickup lenses are stopped in the standard zoom region S4; hence the aperture value can be changed while in the fixed-zoom state in the standard zoom region S4. In other zoom regions also, the fixed-zoom range is necessary in order to control the aperture. These regions are the above wide-angle region S2, standard zoom region S4, and telephoto region S6. The above aperture control method is explained below.

In the collapsed-side end regions of the above wide-angle, standard zoom, and telephoto regions S2, S4, S6 in the cam groove of the cam ring 3, a stopping region is provided in which the cam followers 11, 12 are to stop; these stopping regions are the wide-angle stopping region RW, standard zoom stopping region RS, and telephoto stopping region RT, shown in the above-mentioned FIG. 5. These stopping regions include the regions, within the region in which the output of PR 28 is "H", from the end on the collapsed-position side of each of the wide-angle, standard zoom, and telephoto regions in the cam groove, to the transition points at which the output of the PR 28 changes between "H" and "L". By detecting the above encoder output during rotation of the cam ring 3, the arrival of the cam followers at each of the above stopping regions is detected. Immediately after an operation to change the magnifying power of the pickup lenses (zoom operation), or after aperture driving, the cam followers 11, 12 are made to always stop in the above stopping regions, and await a subsequently executed zoom operation or aperture operation.

In order to execute zoom-up driving, in the above step S201 the driving circuit 35 is controlled so as to cause the driving motor 21 to rotate in the CW (clockwise) direction. When the driving motor 21 rotates in the CW direction, the cam ring 3 rotates in the D1 direction (zoom-up direction). The CPU 31 controls the driving motor 21 while detecting changes in the encoder output (passage through output transition points) of the PR 28. In steps S202, S203 and S204, checks of changes in the encoder output are performed while awaiting further operation.

That is, in step S202 the encoder output is checked for a change from "H" to "L". If, as described above, the pickup lenses are supposed to be positioned in the standard zoom stopping region RS, then rotation of the cam ring 3 in the D1 direction causes the cam follower 11 to move along the cam groove 3b. Then, arrival at the transition point P1 (see FIG. 5), and detection of a change in the encoder output from "H" to "L", is awaited. When the above output change is detected, execution proceeds to step S203.

Next, in step S203 the encoder output is checked for a change from "L" to "H". As in the above-described example, if the pickup lenses are supposed to be in the standard zoom position, then the cam follower 11 moves along the cam groove 3b, and arrival at the transition point P2 (see FIG. 5), and detection of a change in the encoder output from "L" to "H", is awaited. When the above output change is detected, execution proceeds to step S204.

In step S204, the encoder output is checked for a change from "H" to "L". In the above-described example, the pickup lenses are extended from the standard zoom position to the telephoto position. When the cam follower 11 moves along the cam groove 3b in the zoom-up direction and arrives at the transition point P3 (see FIG. 5), and a change in the encoder output from "H" to "L" is detected, execution proceeds to step S205. If arrival at the above transition point P3 is detected, the cam follower 11 has already passed the telephoto stopping region RT at which it was to stop.

Then, in step S205, braking is applied to the driving motor 21, which is stopped temporarily, and in step S206 the driving motor 21 is rotated backward in the CCW (counterclockwise) direction. By means of this rotation the cam ring 3 is rotated in the D2 direction, and the cam follower 11 returns in the direction of the standard zoom region. In step S207, detection of the transition point at which the encoder output changes from "L" to "H" is awaited. When the above detection occurs, the cam follower 11 has arrived at the above transition point, and a state obtains in which the pickup lenses are positioned in the stopping region zoomed-up by one stage. In the above-described example, when arrival from the telephoto side at the transition point P4 (at the same position as transition point P3) is detected, the cam follower 11 is positioned in the telephoto stopping region RT, and the pickup lenses have arrived at the telephoto position.

Then, in step S208 the motor terminals of the driving motor 21 are electrically short-circuited to stop the motor. This braking operation by means of terminal short-circuiting is hereafter referred to simply as "braking".

In step S209, the information on a current position is stored in the zoom position register 31a. In the above-described example, the telephoto position information is stored in the zoom position register 31a. Execution then returns to the main routine.

Next, details of processing operations of the above-mentioned "zoom-down driving" subroutine are explained, using the flowchart of FIG. 10.

This subroutine is also executed under control of the CPU 31. First, in step S300 the contents of the zoom position register 31a are inspected. If the contents of the zoom position register 31a indicate the wide-angle position, because the pickup lenses cannot be driven in the wide-angle direction, execution returns to the main routine without change. If the contents of the zoom position register 31a are other than the contents of the wide-angle position, execution proceeds to step S301. Hereafter, an explanation is given, referring to FIG. 5, assuming that the current zoom position of the pickup lenses is the standard zoom position, and more specifically, is the standard zoom stopping region RS.

In step S301, the driving circuit 35 is controlled to cause the driving motor 21 to rotate in the CCW direction. By means of the above rotation of the driving motor 21, the cam ring 3 rotates in the D2 direction (zoom-down direction), and the encoder output of the PR 28 changes. The CPU 31 controls the driving motor 21 while detecting this output change (passage through transition points). In steps S302 and S303, checks of changes in the encoder output are performed while awaiting further operation.

That is, in step S302 the encoder output is checked for a change from "H" to "L". If, as described above, the pickup lenses are supposed to be positioned in the standard zoom stopping region RS, then the descent of the cam follower 11 along the cam groove 3b on the zoom-down side, arrival at the transition point P5 (see FIG. 5), and detection of a change in the encoder output from "H" to "L", is awaited. When the above output change is detected, execution proceeds to step S303.

Next, in step S303 the encoder output is checked for a change from "L" to "H". As in the above-described example, if the pickup lenses are supposed to be initially in the standard zoom stopping region RS, then the cam follower 11 moves along the cam groove 3b, and arrival at the transition point P6 (see FIG. 5), and detection of a change in the encoder output from "L" to "H", is awaited. When arrival at the above transition point P6 is detected, the cam follower 11 has arrived in the telephoto stopping region RW at which it is to stop. The pickup lenses have also arrived at positions zoomed-down by one stage.

Then, in step S304, braking is applied to the driving motor 21 to stop it. In step S305 the information on a current zoom position is stored in the zoom position register 31a. In the above-described example, wide-angle position information is stored in the zoom position register 31a. Execution then returns to the main routine.

Next, details of processing operations of the above-described "aperture driving (A)" subroutine are explained, using the flowchart of FIG. 11.

This subroutine is also executed under control of the CPU 31. Rotational driving of the cam ring 3 causes the aperture ring 6 to be rotated by a prescribed relative angle, via the aperture cam groove 3d, to set a desired aperture value. That is, by means of rotational driving of the cam ring 3, the pin contact face of the aperture cam groove 3d presses against and drives the aperture driving pin 13, and the aperture ring 6 is rotated by a prescribed relative angle with respect to the lens frame 4. By means of this rotation, the plurality of aperture blades 7 (see FIG. 2) of the aperture ring 6 are moved circularly to change the aperture opening, to set different aperture values.

The cam ring rotation angle at which the above different aperture values are obtained (the rotation angle of the aperture ring 6) is detected from the number of output pulses of the PI 26. As the above number of output pulses, the number of counts of PI 26 output pulses (the output from the pulse signal generation circuit 37) is employed, with reference to each zoom stopping region—for example, from the transition point in the output of the lens position encoder (PR 28) at the end position of the standard zoom stopping region RS. The relation between the number of PI 26 output pulses from the above transition point (reference position) and the aperture value Fno will differ depending on the zoom state (focal length) of the pickup lenses; as an example, a relation between the aperture value Fno and the above number of PI output pulses when the pickup lenses are in the standard zoom position is assumed as shown in Table 1.

TABLE 1

| Aperture Value | PI Output |
| --- | --- |
| Fno = 11 | 100 pulses |
| Fno = 8.0 | 150 pulses |
| Fno = 5.6 | 200 pulses |
| Fno = 4.0 | 250 pulses |
| Fno = 2.8 | 300 pulses |
| Fno = 2.0 | 350 pulses |

The relational table data in Table 1 for the above standard zoom state, and table data for the relation between aperture value Fno and the above number of PI output pulses for the wide-angle and telephoto states, are stored in non-volatile memory 45.

The number of pulses in the above table data changes due to errors in the position of application of the reflective tape 27, and cannot easily be determined unambiguously for one type of camera. In order to set the aperture value more accurately, relational table data for each zoom position, including wide-angle, standard zoom, and telephoto, measured for individual cameras, is stored for each camera in non-volatile memory (EEPROM) 45.

In processing of the above aperture driving (A) subroutine, in step S400 the number of PI output pulses corresponding to the aperture value set in step S110 of the main routine (see FIG. 8) is read from non-volatile memory 45. If it is assumed that the pickup lenses are in the standard zoom position, then when setting Fno=4.0, Table 1 indicates that driving should be for 250 pulses.

In step S401, the number of PI output pulses read in the above step is set in a prescribed register in the CPU 31. In step S402, the driving motor 21 is rotated in the CW direction, causing the cam ring 3 to rotate in the D1 direction. In step S403, detection of the transition point at which the encoder output changes from "H" to "L" is awaited. When the above transition point is detected, execution proceeds to step S404, and counting of the number of pulses is begun. At this time, the aperture value Fno changes gradually from the minimum aperture value Fno 11 to the fully-open aperture value Fno 2.0 accompanying rotation of the driving motor 21, as shown in FIG. 13.

In step S405, coincidence of the count of the above PI output pulses with the value set in the above register is awaited. For example, if the aperture setting is Fno=4.0 as described above, then when the number of PI output pulses reaches 250 pulses, the aperture is in the desired set state, as shown in FIG. 13.

Execution then proceeds to step S406, braking is applied to the driving motor 21, the cam ring 3 is stopped, and movement of the pickup lenses is stopped. Execution then returns to the main routine.

Next, details of processing operations of the above-described "aperture driving (B)" subroutine are explained, using the flowchart of FIG. 12.

This subroutine is also executed under control of the CPU 31, and is processing to return to the state prior to execution of the above "aperture driving (A)" subroutine. For example, if it is assumed that the current lens focal length state is the standard zoom state, then the cam ring is rotated, the aperture value is put into the original minimum aperture state, and the aperture driving pin 13 is returned to the standard zoom stopping region RS of FIG. 5.

First, in step S500 the driving motor 21 is rotated in the CCW direction, and the cam ring 3 is rotated in the D2 direction. In step S501, detection of a transition point at which the encoder output of PR 28 changes from "L" to "H" is awaited. For example, in a state in which the pickup lenses are in the standard zoom position, detection of the transition point P1 is awaited. When the above transition point is detected, execution proceeds to step S502.

In step S502, braking is applied to the driving motor 21, and the pickup lenses are stopped. Execution is then returned to the main routine.

As described above, in an electronic camera 60 incorporating the lens driving device of this aspect, cam grooves 3a, 3b for zoom driving of lens frames 4, 5 to hold pickup lenses are provided in a cam ring 3, and diagonal cam grooves and circumferential-direction cam grooves to furnish zoom positions in stages of the respective pickup lenses are provided in the cam grooves 3a and 3b. In a state in which the cam followers 11, 12 for lens frame forward/backward driving are positioned in circumferential-direction cam grooves, the above lens frames 4, 5 are held in their respective zoom positions even if the cam ring 3 is rotated. By rotating the aperture ring 6 relative to the lens frame 4 in a rotation region in which the lens frames 4, 5 are fixed in respective zoom positions, the aperture value is set. Hence by means of a driving motor 21 as a single driving source rotating the cam ring 3, zoom driving in stages and aperture driving with high accuracy in the lens barrel 1 is realized. This driving mechanism can be configured from simple members, and the above camera can be made compact.

Note that the above-described aspect is an example of incorporation of the above lens barrel 1 into an electronic camera 60 employing a pickup element; however, the configuration of the above lens barrel 1 can also be applied to cameras using silver-salt film and to other optical devices.

By means of the above invention, a lens driving device can be provided in which prescribed zoom values and arbitrary aperture values can be combined and set by means of a simple configuration employing a single driving source.

What is claimed is:

1. A lens driving device comprising:
    a lens optical system having a moving lens group movable along a direction of an optical axis, and a focal length which can be altered in stages among a plurality of values;
    a moving lens group frame holding said moving lens group;
    an aperture device provided within said lens optical system, and having a variable aperture value which can be modified in both an ascending and descending manner;
    a single driving source for changing the focal length value of said lens optical system and the aperture value of said aperture device; and
    a driving member driven by said single driving source for driving said moving lens group frame to achieve a desired focal length value of said lens optical system from among said plurality of focal length values, and for then driving the aperture device to change the variable aperture value of said aperture device in at least one of the ascending and descending manner at the desired focal length value while maintaining the desired focal length value;
    wherein the driving member is adapted to drive the aperture device to change the variable aperture value in both the ascending direction and in the descending direction while maintaining the desired focal length value.

2. The lens driving device according to claim 1, wherein said driving member includes:
    a lens driving cam comprising, in sequential connection, a first cam region which performs driving to displace said moving lens group frame in the optical axis direction, and a second cam region which does not perform driving to displace said moving lens group frame in the optical axis direction; and an aperture driving cam formed separately from said lens driving cam for performing driving to change the aperture value of said aperture device when said moving lens group frame is in a state of not being displaced in the optical axis direction due to said moving lens group frame being in said second cam region.

3. The lens driving device according to claim 2, wherein:
    said driving member comprises a cam ring of cylindrical shape having a substantially uniform wall thickness; and said lens driving cam and said aperture driving cam are formed in the cam ring of cylindrical-shape as cam holes or as cam grooves.

4. The lens driving device according to claim 2, wherein:
said aperture driving cam is formed so as not to change the aperture value of said aperture device during driving displacement of said moving lens group frame in the first cam region.

5. The lens driving device according to claim 2, further comprising an impelling member, provided in said aperture device, which impels said aperture device in a prescribed direction such that the aperture value of said aperture device assumes a value determined in advance; and
wherein while said moving lens group frame is driven and displaced in the first cam region, said aperture value of said aperture device attains said aperture value set in advance by means of the impelling force of said impelling member, without said aperture device being engaged with said aperture driving cam.

6. The lens driving device according to claim 5, wherein said aperture device is impelled in a direction in which an aperture diameter is decreased.

7. The lens driving device according to claim 1, wherein said driving member is formed such that said moving lens group frame is driven to achieve the desired focal length of said lens optical system, and said aperture device can then be driven to modify the aperture value while maintaining the desired focal length value.

8. The lens driving device according to claim 2, wherein said driving member is formed such that said moving lens group frame is driven to achieve the desired focal length of said lens optical system, and said aperture device can then be driven to modify the aperture value while maintaining the desired focal length value.

9. A lens driving device comprising;
two moving lens group frames, each capable of different movement in an optical axis direction;
an aperture device provided in one of said moving lens group frames, and having a variable aperture value which can be modified in both an ascending and descending manner;
a cam member including: (i) two lens driving cams each having a first cam portion and a second cam portion that are formed successively to drive corresponding moving lens groups, and (ii) a third cam portion formed separately from said lens driving cams; and
a single driving source for driving said cam member to drive and displace said moving lens group frames to a desired focal length value and to drive said aperture device for changing the variable aperture value;
wherein:
said first cam portion is provided in a range in which said moving lens group frames are driven and displaced in the optical axis direction;
said second cam portion is provided in a range in which said moving lens group frames are not driven and displaced in the optical axis direction; and
said third cam portion drives said aperture device to change the variable aperture value in at least one of the ascending and descending manner at the desired focal length value when said moving lens group frames are in a state of not being displaced in the optical axis direction due to said moving lens group frames being in the range of said second cam portion;
wherein the third cam portion is adapted to drive the aperture device to chance the variable aperture value in both the ascending direction and in the descending direction while maintaining the desired focal length value.

10. The lens driving device according to claim 9, further comprising control means for controlling operation of said cam member, as driven by said driving source, to set a focal length obtained by movement of said moving lens group frames and the aperture of said aperture device to desired values.

11. The lens driving device according to claim 9, wherein:
said cam member comprises a cam ring of cylindrical shape having a substantially uniform wall thickness; and
said first cam portion, said second cam portion, and said third cam portion are formed as cam holes or cam grooves in the cam ring of cylindrical-shape.

12. The lens driving device according to claim 9, wherein:
said third cam portion is formed so as not to change the aperture value of said aperture device during driving displacement of said moving lens group frames in the first cam portion.

13. The lens driving device according to claim 9, further comprising an impelling member, provided in said aperture device, which impels said aperture device in a prescribed direction such that the aperture value of said aperture device assumes a value determined in advance; and
wherein while said moving lens group frames are driven and displaced in the first cam portion, said aperture value of said aperture device attains said aperture value set in advance by means of the impelling force of said impelling member, without said aperture device being engaged with said third cam portion.

14. The lens driving device according to claim 9, wherein said aperture device is impelled in a direction in which an aperture diameter is decreased.

15. The lens driving device according to claim 9, wherein said cam member is formed such that said moving lens group frames are driven to achieve a desired focal length value, and said aperture device can then be driven to modify the aperture value while maintaining the desired focal length value.

* * * * *